(12) United States Patent
Feng et al.

(10) Patent No.: US 10,903,993 B2
(45) Date of Patent: Jan. 26, 2021

(54) SECURELY PERFORMING CRYPTOGRAPHIC OPERATIONS

(71) Applicant: Advanced New Technologies Co., Ltd., Grand Cayman (KY)

(72) Inventors: Zhiyuan Feng, Hangzhou (CN); Yanpeng Li, Hangzhou (CN); Long Cheng, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/587,593

(22) Filed: Sep. 30, 2019

(65) Prior Publication Data

US 2020/0313881 A1 Oct. 1, 2020

Related U.S. Application Data

(63) Continuation of application No. PCT/CN2019/080384, filed on Mar. 29, 2019.

(51) Int. Cl.
*H04L 29/06* (2006.01)
*H04L 9/08* (2006.01)
*H04L 9/32* (2006.01)

(52) U.S. Cl.
CPC .......... *H04L 9/0866* (2013.01); *H04L 9/0825* (2013.01); *H04L 9/0897* (2013.01); *H04L 9/3231* (2013.01)

(58) Field of Classification Search
CPC ... H04L 9/0866; H04L 9/0825; H04L 9/0897; H04L 9/3231

(Continued)

(56) References Cited

U.S. PATENT DOCUMENTS

| 5,715,431 A | 2/1998 | Everett et al. |
| 6,031,910 A | 2/2000 | Deindl et al. |

(Continued)

FOREIGN PATENT DOCUMENTS

| CN | 201126581 | 10/2008 |
| CN | 101436247 | 5/2009 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Evans Desrosiers
(74) *Attorney, Agent, or Firm* — Fish & Richardson P.C.

(57) ABSTRACT

Disclosed herein are methods, systems, and apparatus, including computer programs encoded on computer storage media, for securely performing cryptographic operations. One of the methods includes receiving biometric information associated with a user and a request to perform one or more cryptographic operations based on one or more cryptographic keys stored in a memory of an identity cryptographic chip (ICC); comparing the biometric information associated with the user with biometric information pre-stored in the memory of the ICC as pre-stored biometric information; and in response to determining that the biometric information matches the pre-stored biometric information, authorizing the one or more cryptographic operations to be performed.

27 Claims, 10 Drawing Sheets

(58) Field of Classification Search
USPC .......................................................... 713/189
See application file for complete search history.

(56) References Cited

U.S. PATENT DOCUMENTS

| | | | |
|---|---|---|---|
| 7,340,462 | B2 | 3/2008 | Bertrand |
| 7,707,225 | B2 | 4/2010 | Akashika et al. |
| 8,775,757 | B2 | 7/2014 | Polzin et al. |
| 8,832,465 | B2 | 9/2014 | Gulati et al. |
| 9,559,737 | B2 | 1/2017 | Shriya et al. |
| 10,079,677 | B2 | 9/2018 | Benson et al. |
| 10,116,440 | B1 * | 10/2018 | Rudzitis ............... H04L 9/0825 |
| 10,536,271 | B1 | 1/2020 | Mensch et al. |
| 2005/0027991 | A1 | 2/2005 | DiFonzo |
| 2005/0044375 | A1 | 2/2005 | Paatero et al. |
| 2006/0059372 | A1 | 3/2006 | Fayar et al. |
| 2006/0078109 | A1 | 4/2006 | Akashika et al. |
| 2008/0178009 | A1 | 7/2008 | Funahashi |
| 2008/0192937 | A1 | 8/2008 | Challener |
| 2008/0215890 | A1 | 9/2008 | Buer |
| 2009/0065591 | A1 | 3/2009 | Paul et al. |
| 2009/0235068 | A1 | 9/2009 | Song et al. |
| 2009/0282260 | A1 | 11/2009 | Tattan et al. |
| 2010/0161992 | A1 | 6/2010 | Schuetze et al. |
| 2011/0302420 | A1 | 12/2011 | Davida |
| 2012/0131350 | A1 * | 5/2012 | Atherton ............... H04L 9/3231 |
| | | | 713/186 |
| 2012/0303966 | A1 | 11/2012 | Hubner |
| 2013/0147603 | A1 | 6/2013 | Malhas et al. |
| 2013/0276074 | A1 | 10/2013 | Orsini et al. |
| 2013/0305055 | A1 | 11/2013 | Atherton |
| 2013/0308838 | A1 | 11/2013 | Westernman et al. |
| 2014/0089617 | A1 | 3/2014 | Polzin et al. |
| 2014/0089682 | A1 | 3/2014 | Gulati et al. |
| 2014/0108786 | A1 | 4/2014 | Kreft |
| 2014/0237256 | A1 | 8/2014 | Ben Ayed |
| 2014/0267476 | A1 | 9/2014 | Simpson et al. |
| 2015/0006914 | A1 | 1/2015 | Oshida |
| 2015/0046707 | A1 | 2/2015 | Atherton |
| 2015/0095999 | A1 | 4/2015 | Toth |
| 2015/0242607 | A1 | 8/2015 | Morris et al. |
| 2015/0270962 | A1 | 9/2015 | Hautier et al. |
| 2015/0295908 | A1 | 10/2015 | O'Hare et al. |
| 2015/0303964 | A1 | 10/2015 | Shriya et al. |
| 2016/0072801 | A1 | 3/2016 | Cao et al. |
| 2016/0224776 | A1 * | 8/2016 | Leow ...................... G06F 21/32 |
| 2016/0275461 | A1 | 9/2016 | Sprague et al. |
| 2016/0349999 | A1 | 12/2016 | Adler et al. |
| 2016/0359965 | A1 | 12/2016 | Murphy et al. |
| 2017/0213211 | A1 | 7/2017 | Sibert et al. |
| 2017/0270509 | A1 | 9/2017 | Colegate et al. |
| 2017/0357967 | A1 | 12/2017 | Sykora et al. |
| 2017/0373843 | A1 | 12/2017 | Benson et al. |
| 2017/0373844 | A1 | 12/2017 | Sykora et al. |
| 2018/0173871 | A1 | 6/2018 | Toth |
| 2018/0181739 | A1 | 6/2018 | Zhong et al. |
| 2018/0287792 | A1 | 10/2018 | Fu |
| 2018/0309581 | A1 | 10/2018 | Butler et al. |
| 2018/0367311 | A1 | 12/2018 | Stahlberg et al. |
| 2019/0019144 | A1 | 1/2019 | Gillen |
| 2019/0026724 | A1 | 1/2019 | Wade et al. |
| 2019/0028283 | A1 | 1/2019 | Sharifi et al. |
| 2019/0028284 | A1 | 1/2019 | Rezayee et al. |
| 2019/0095671 | A1 | 3/2019 | Yeke Yazdandoost et al. |
| 2019/0116049 | A1 | 4/2019 | Ittogi et al. |
| 2019/0305949 | A1 | 10/2019 | Hamel et al. |
| 2019/0305952 | A1 | 10/2019 | Hamel et al. |
| 2020/0004967 | A1 | 1/2020 | Fu et al. |

FOREIGN PATENT DOCUMENTS

| | | |
|---|---|---|
| CN | 101467430 | 6/2009 |
| CN | 101764694 | 6/2010 |
| CN | 102594843 | 7/2012 |
| CN | 103138927 | 6/2013 |
| CN | 104239815 | 12/2014 |
| CN | 105975839 | 9/2016 |
| CN | 106301767 | 1/2017 |
| CN | 107241317 | 10/2017 |
| CN | 108540457 | 9/2018 |
| CN | 108881000 | 11/2018 |
| CN | 108900296 | 11/2018 |
| CN | 109150535 | 1/2019 |
| EP | 1175749 | 1/2002 |
| EP | 1370022 | 12/2003 |
| JP | 10247906 | 9/1998 |
| JP | 2001319164 | 11/2001 |
| JP | 2004104539 | 4/2004 |
| JP | 2006079181 | 3/2006 |
| JP | 2007018301 | 1/2007 |
| JP | 2008198186 | 8/2008 |
| JP | 2018124959 | 8/2018 |
| TW | 200949603 | 12/2009 |
| TW | 201328280 | 7/2013 |
| TW | 201741922 | 12/2017 |
| TW | 201901551 | 1/2019 |
| WO | WO 2004014017 | 2/2004 |

OTHER PUBLICATIONS

Nakamoto, "Bitcoin: A Peer-to-Peer Electronic Cash System," www.bitcoin.org, 2005, 9 pages.
European Extended Search Report in European Patent Application No. 19732215.9, dated Mar. 25, 2020, 7 pages.
European Extended Search Report in European Patent Application No. 19732240.7, dated May 15, 2020, 9 pages.
U.S. Appl. No. 16/587,901, filed Sep. 30, 2019, Zhiyuan Feng.
U.S. Appl. No. 16/588,106, filed Sep. 30, 2019, Zhiyuan Feng.
U.S. Appl. No. 16/587,978, filed Sep. 30, 2019, Zhiyuan Feng.
PCT International Search Report and Written Opinion in International Application No. PCT/CN2019/080366, dated Jan. 3, 2020, 6 pages.
PCT International Search Report and Written Opinion in International Application No. PCT/CN2019/080372, dated Dec. 27, 2019, 6 pages.
PCT International Search Report and Written Opinion in International Application No. PCT/CN2019/080384, dated Dec. 27, 2019, 7 pages.
PCT International Search Report and Written Opinion in International Application No. PCT/CN2019/080393, dated Dec. 27, 2019, 8 pages.
European Extended Search Report in European Patent Application No. 19732220.9, dated Jun. 16, 2020, 6 pages.
Extended European Search Report in European Application No. 19732221.7, dated Sep. 8, 2020, 11 pages.

* cited by examiner

SECURELY PERFORMING CRYPTOGRAPHIC OPERATIONS

CROSS-REFERENCE TO RELATED APPLICATIONS

This application is a continuation of PCT Application No. PCT/CN2019/080384, filed on Mar. 29, 2019, which is hereby incorporated by reference in its entirety.

TECHNICAL FIELD

This specification relates to identity authentication technology and data security.

BACKGROUND

Identity authentication technology is commonly used in computer networks to verify user identity and ensure data security. Identity information, as other information digitally stored or communicated in the computer networks, can be represented by a set of data. Computers can identify and authenticate a user based on the digital identity of a user. For data security, it is important to ensure that a digital identity belongs to an authorized user, or in other words, the digital identity matches the actual identity.

As technology has evolved, decentralized systems, such as blockchain networks and Internet of things (IoT) networks have emerged. Under decentralized systems, it is possible for individuals to safely self-store their own identity information. For example, a user can hold a digital wallet, which stores a private key that the user can use to add a digital signature to authorize transactions in a blockchain network or on IoT devices. The private key is normally stored as a data string with cryptographic semantics on a computing device and is intended to be only accessible to the user. As other data strings, the private key can potentially be copied and shared. Any users who have the private key can control digital assets associated with the private key. Moreover, the digital assets cannot be retrieved if the private key is lost. Therefore, secure storage and efficient use of cryptographic keys can be important.

It would be desirable to develop a key management technology that can safely manage cryptographic keys and perform cryptographic operations based on the true identity of a user.

SUMMARY

This specification describes technologies for securely managing cryptographic keys and performing cryptographic operations based on user identity information. These technologies generally involve receiving biometric information associated with a user and a request to perform one or more cryptographic operations; in response to determining that the biometric information matches pre-stored biometric information, authorizing the one or more cryptographic operations to be performed.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

This specification describes technologies for securely managing cryptographic keys and performing cryptographic operations based on user identity information. These technologies generally involve receiving biometric information associated with a user and a request to perform one or more cryptographic operations; in response to determining that the biometric information matches pre-stored biometric information, authorizing the one or more cryptographic operations to be performed.

Figure 1:
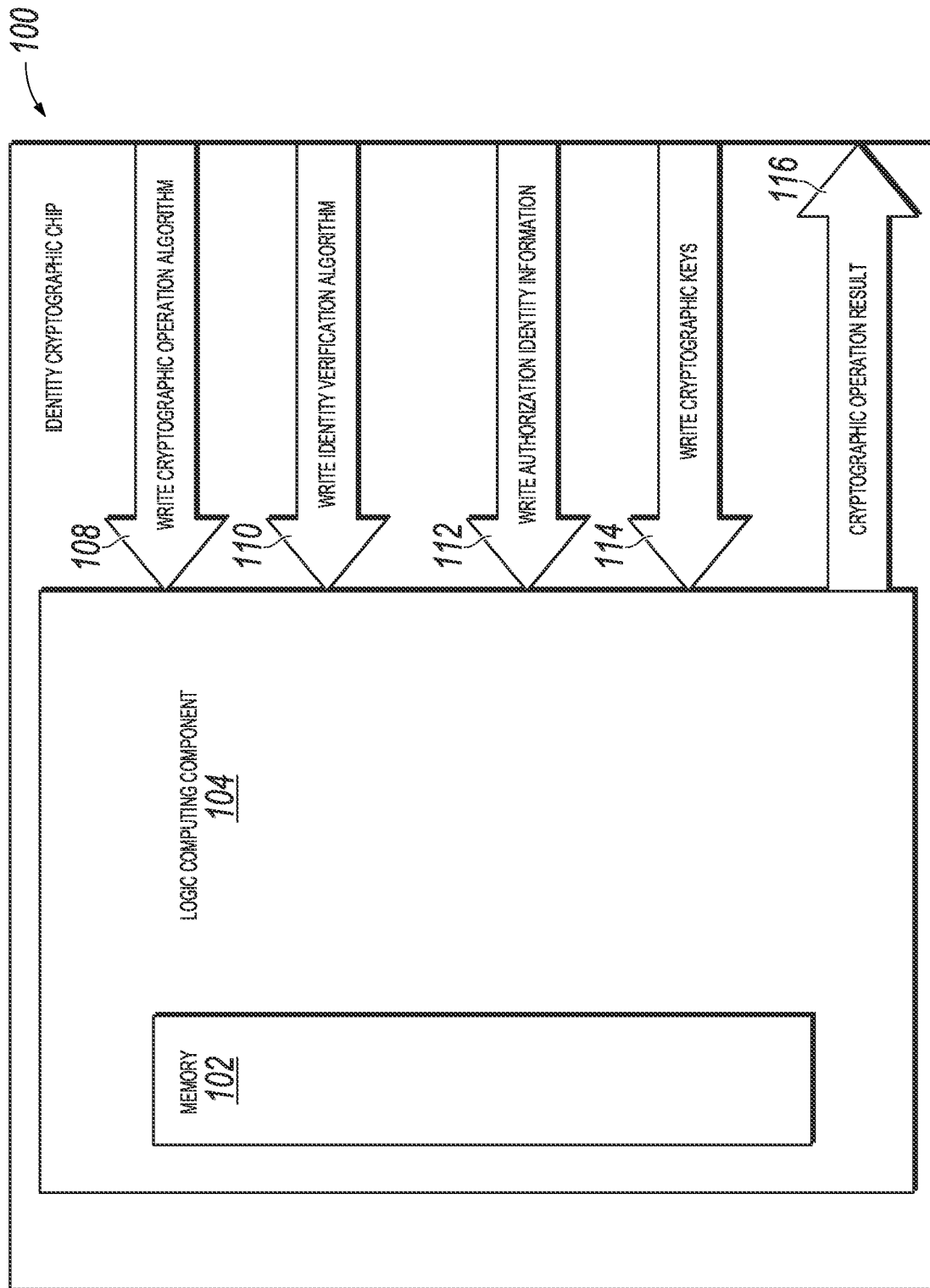
FIG. 1 is a diagram illustrating an example of an identity cryptographic chip for performing processes that can be used to execute embodiments of this specification.

FIG. 1 is a diagram illustrating an example of an ICC 100 for performing processes that can be used to execute embodiments of this specification. At a high-level, the ICC 100 can be a computer chip that includes a memory 102 and a logic computing component 104. The ICC 100 can be used for securely performing cryptographic operations. In some embodiments, the ICC 100 can be a chip set that includes one or more chip components. The memory 102 and the logic computing component 104 can be integrated to different chip components. In some embodiments, the memory 102 can be used to provide permanent storage. In some examples, the memory 102 can be a programmable read-only memory (PROM) that allows to be written once and is read-only afterwards. In some examples, the memory 102 can be an electrically erasable programmable read-only memory (EEPROM) or a Flash memory which can be reformatted and reprogrammed. In some embodiment, the logic computing component can be an application specific integrated circuit (ASIC) or a single chip microcomputer (SCM).

In some computer networks, cryptography is implemented to maintain privacy of data or transactions. For example, in a blockchain network, if two nodes want to keep a transaction private, such that other nodes in the blockchain network cannot discern details of the transaction, the nodes can encrypt the transaction data. Example cryptographic operations include, without limitation, symmetric key encryption and asymmetric key encryption. Symmetric encryption refers to an encryption process that uses a single key for both encryption (generating ciphertext from plaintext), and decryption (generating plaintext from ciphertext).

Asymmetric encryption uses keys pairs that each include a private key, and a public key, the private key being known only to a respective user, and the public key that can be disseminated openly. A user can use the public key of another user to encrypt data, and the encrypted data can be decrypted using the private key of the another user.

Asymmetric encryption can be used to provide digital signatures, which enables participants in a transaction to confirm other participants in the transaction, as well as the validity of the transaction. For example, a user can digitally sign a message, and another user can confirm that the message was sent by the user based on the digital signature. Digital signatures can also be used to ensure that messages are not tampered with in transit. For example, user A is to send a message to user B. User A generates a hash of the message, and then, using its private key, encrypts the hash to provide a digital signature as the encrypted hash. User A appends the digital signature to the message, and sends the message with digital signature to user B. User B decrypts the digital signature using the public key of user A, and extracts the hash. User B hashes the message and compares the hashes. If the hashes are same, user B can confirm that the message was indeed from user A, and was not tampered with.

The ICC 100 can be used for securely managing a user's cryptographic keys and performing cryptographic operations based on verifying the user's identity information. In some embodiments, the identity information can be the user's biometric information, such as fingerprint, voiceprint, heartbeat information, and iris information. The memory 102 can be used to store the ICC 100 user's identity information and cryptographic keys. The memory 102 can also store identity authentication algorithms (e.g., as computer-executable code) and cryptographic operation algorithms (e.g., as computer-executable code). In some embodiments, information and algorithms stored in the memory 102 are encrypted to prevent leakage, even when the ICC 100 is reverse engineered. When a request for performing a cryptographic operation is received from a user, the logic computing component 104 can use identity information collected from the user and the trusted user identity information stored in memory 102 to verify the user's identity based on the identity authentication algorithm. For example, if the identity information is the user's fingerprint image of a fingerprint of the user. The identity authentication algorithm can be a local authentication algorithm that compares the fingerprint image collected from the user and a stored fingerprint image. If the collected fingerprint image matches the stored fingerprint image, the user's identity is successfully verified, the logic computing component 104 can then allow the cryptographic keys to be stored, or use existing cryptographic keys stored in memory 102 to perform the requested cryptographic operation. After the cryptographic operation is performed, the operation result can be output by the ICC 100. By using the ICC 100, cryptographic operations can be stored or performed only after a user's identity is verified or authenticated. As such, the user's authority to use the ICC 100 can be guaranteed. Moreover, since the cryptographic keys are stored in the ICC 100 as ciphertext, the cryptographic operations are performed inside the ICC 100. Only the operation result is output from the ICC 100. In this manner, the security of the cryptographic keys can be ensured.

At 108, a cryptographic operation algorithm is written to the ICC 100. The cryptographic operation algorithm can be used for performing cryptographic operations such as data encryption, data decryption, and digital signature verification. At 110, an identity verification algorithm can be written to the ICC 100. The identity verification algorithm can be used for verifying the user's identity to determine whether the user can be permitted to use the ICC 100 for performing cryptographic operations.

At 112, authorization identity information is input to the ICC 100. The authorization identity information can be input to the ICC 100 during the initialization of the ICC 100. In some embodiments, the authorization identity information can be biometric information of the user, such as fingerprint, voiceprint, heartbeat information, or iris information. In some embodiments, the authorization identity information can be input by the owner of the ICC 100. As will be further discussed in the embodiments of the specification, the user who input the authorization identity information can use it to control cryptographic key input to the ICC 100. Cryptographic keys cannot be input to the ICC 100 unless user identity can be verified based on the authorization identity information.

The authorization identity information can be used for performing identity verification, so as to provide authorization for storing cryptographic keys or performing cryptographic operations. The identity information can be collected by a computing device communicably coupled with the ICC 100. For example, the computing device can be a smart watch that can detect biometric information of the user.

In some embodiments, the content of the memory 102 is cleared and the authorization identity information is written to the memory 102. In some embodiments, the memory 102 is a permanent storage memory. In some embodiments, to prevent tampering, the user's identity information can only be written to a storage unit of the memory 102 once. If new identity information needs to be used to replace the existing identity information, the content of the memory 102 may be erased before the new identity information can be written. In some embodiments, the authorization identity information can be encrypted before writing to the memory 102 to enhance security.

At 114, one or more cryptographic keys are written to the memory 102 of the ICC 100. In some embodiments, a user's identity information and a request for writing the one or more cryptographic keys to the memory 102 are received before the one or more cryptographic keys are written to the memory. The identity information can be biometric information, such as fingerprint, voiceprint, heartbeat information, or iris information. The identity information can be collected by a computing device communicably coupled with the ICC 100. In some embodiments, the authorization identity information is read from the memory 102 to verify the user's identity. The verification can be performed based on matching the user's identity information received at 114 with the authorization identity information. If the identity information matches, the verification is successful. The user is then determined as an authorized user of the ICC 100 and the one or more cryptographic keys are permitted to be written to the memory 102. Otherwise, the request is rejected. In some embodiments, the one or more cryptographic keys are encrypted before writing to the memory 102 to enhance security. In some embodiments, the one or more cryptographic keys can be written to a storage unit of the memory 102 separate from the storage unit storing the authorization information.

In some embodiments, the ICC 100 may receive a user's identity information and a request for performing a cryptographic operation. The identity information can be collected by a computing device communicably coupled with the ICC 100. For example, the computing device can be a smart watch that can detect a user's biometric information. After the identity information is collected, it can be sent to the ICC 100. In some embodiments, the data that the cryptographic operation is to be performed on can also be sent to the ICC 100. For example, if the cryptographic operation is encryption, the corresponding data can be a data file to be encrypted. Afterwards, the authorization identity information written in the memory 102 at 112 can be read from the memory 102 to perform identity verification. The identity verification can be performed based on comparing the identity information received at 114 with the authorization identity information. If the identity information matches, the verification is successful and the corresponding cryptographic key information is read from the memory 102 to perform the cryptographic operation. If the identity information does not match, the verification is unsuccessful. Then the request for performing the cryptographic operation can be declined. In some embodiments, the identity verification can be performed using an identity verification algorithm written to the ICC 100 at 110 based on the particular type of identity information received. In some embodiments, the cryptographic operation can be performed based on a cryptographic operation algorithm written to the ICC 100 at 108. As described above, the cryptographic operation can be encryption, decryption, or adding a digital signature to the data. After performing the cryptographic operation, the operation result can be output at 116.

Figure 2:
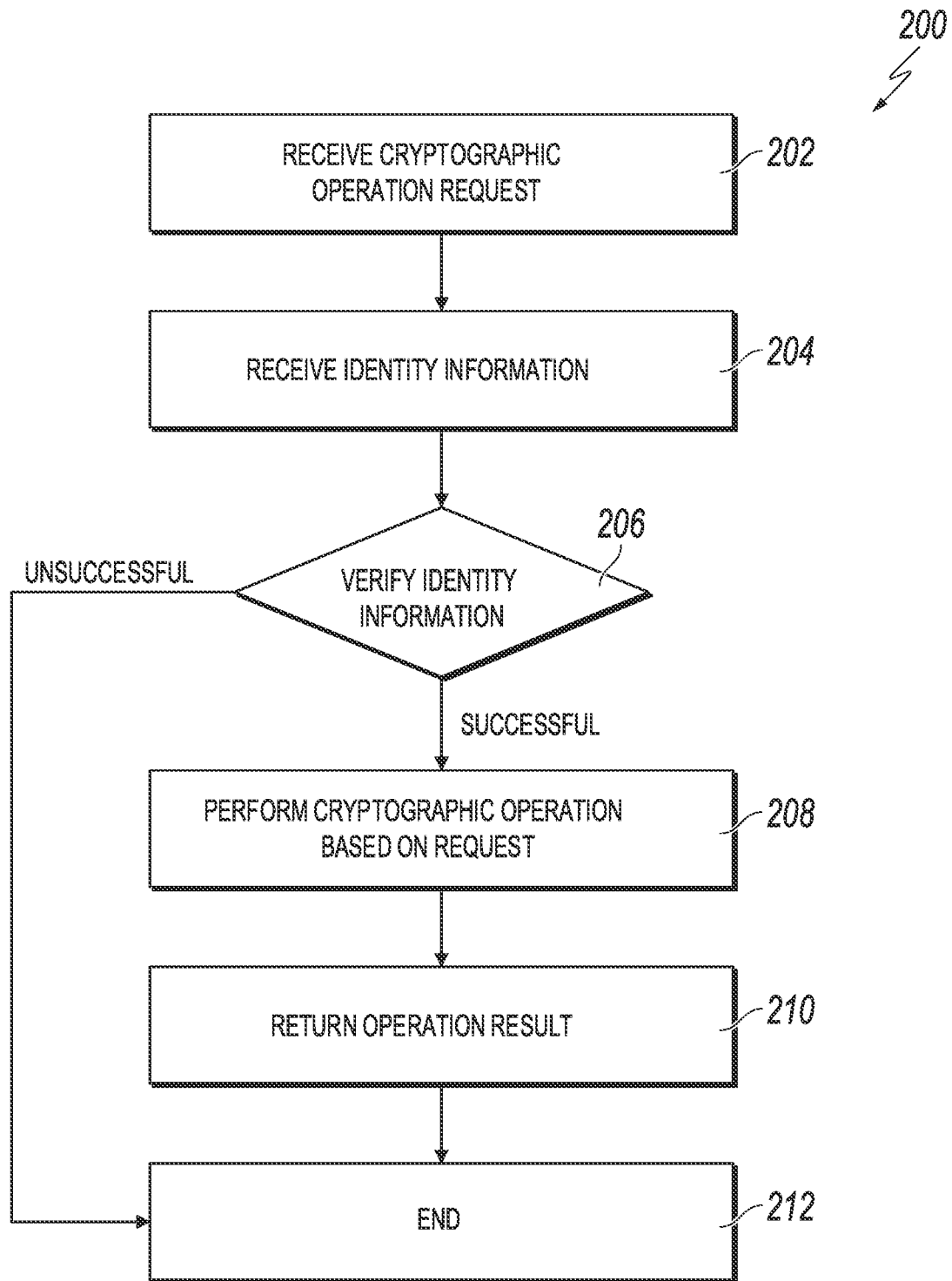
FIG. 2 is a flowchart illustrating an example of a process for performing a cryptographic operation using an identity cryptographic chip (ICC), in accordance with embodiments of this specification.

FIG. 2 is a flowchart illustrating an example of a process 200 for performing a cryptographic operation using an ICC in accordance with embodiments of this specification. At 202, a request for performing a cryptographic operation is received. Examples of cryptographic operations can include data encryption, decryption, and adding a digital signature. At 204, identity information of a user is received. As discussed in the description of FIG. 1, the identity information can be collected by a computing device and sent to the ICC. At 206, the identity information can be verified. In some embodiments, the identity information can be compared with the identity information stored in the memory of the ICC. If the identity information matches the stored identity information, the verification is successful, the requested cryptographic operation can then be performed at 208 using the user's cryptographic key stored in the memory of the ICC. Otherwise, the process 200 ends at 212. After 208, the process 200 proceeds to 210 where the operation result is returned. The operation result can depend on the cryptographic operation performed at 208. For example, if the cryptographic operation is file encryption, a file encrypted using the user's public key can be returned. Similarly, if the cryptographic operation is file decryption, a file decrypted using the user's private key can be returned. If the cryptographic operation is adding a digital signature, a file with the user's digital signature generated by its private key can be returned. After 210, the process ends at 212.

Figure 3:
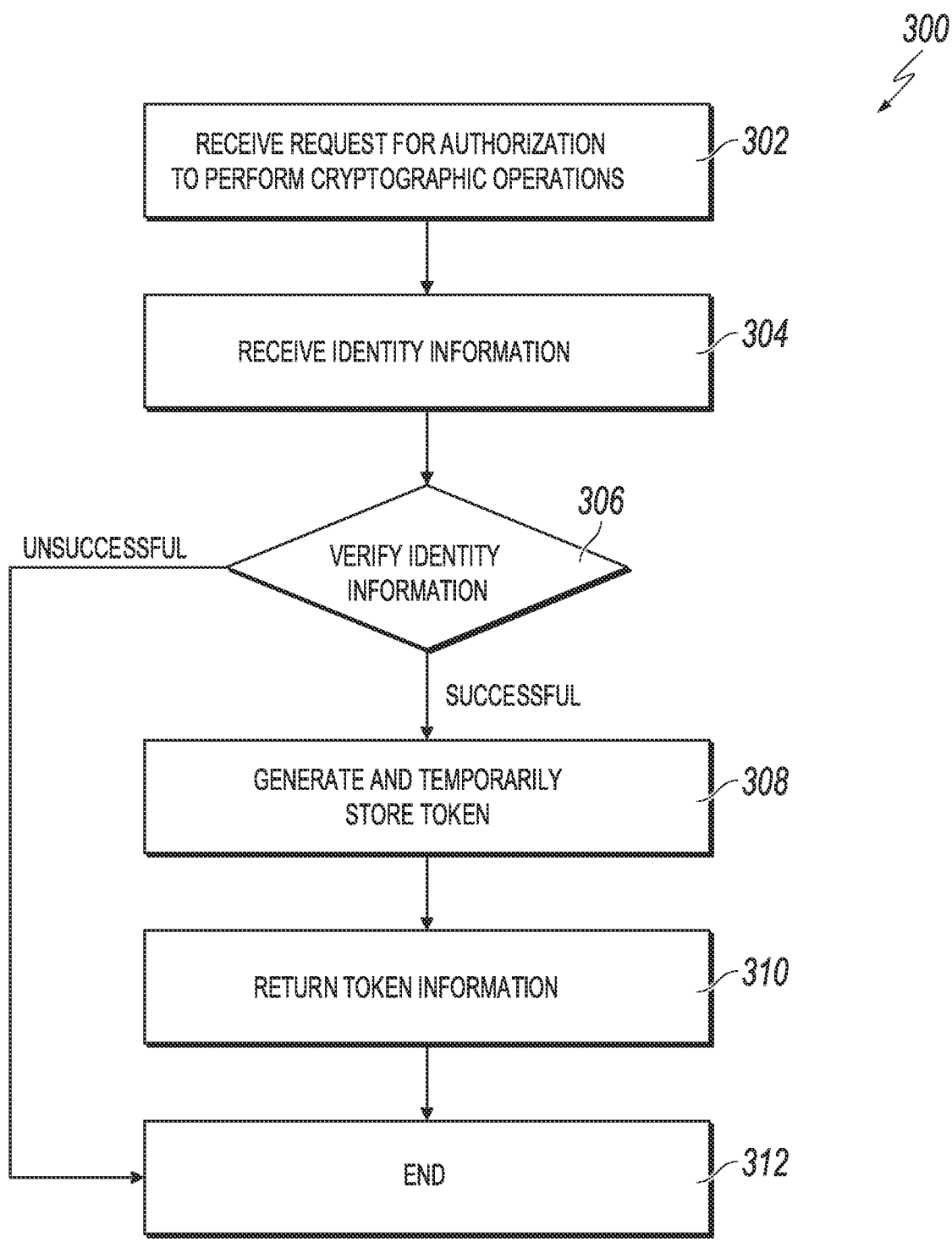
FIG. 3 is a flowchart illustrating an example of a process for generating a token for performing one or more cryptographic operations using an ICC, in accordance with embodiments of this specification.

FIG. 3 is a flowchart illustrating an example of a process 300 for generating a token for performing one or more cryptographic operations using an ICC in accordance with embodiments of this specification. At 302, a request for authorization to perform one or more cryptographic operations is received by the ICC. The requested authorization can be one or more of an authorization for performing the cryptographic operations for a number of times or during a predetermined period. For example, after a user's identity is verified, the user can use the ICC to perform a requested number of cryptographic operations, or within a requested time period without needing to verify its identity again. Example cryptographic operations can include data encryption, decryption, or adding a digital signature.

At 304, identity information of a user is received by the ICC. The identity information can be collected by a computing device communicably coupled with the ICC 100. For example, the computing device can be a smart watch that can detect a user's biometric information, such as heartbeat or fingerprint information. After the identity information is collected, it can be sent to the ICC 100.

At 306, the received identity information can be verified. The verification can be performed based on matching the user's identity information with the authorization identity information. If the identity information matches, the verification is successful. The user is then determined as the authorized user of the ICC 100 and the one or more cryptographic keys are permitted to be written to the memory 102. Otherwise, the verification is unsuccessful and the process 300 ends at 312. If the identity information is successfully verified, a token is generated and temporarily stored in the ICC at 308. The token can be generated based on the request received at 302. In some embodiments, the token can provide authorizations for performing cryptographic operations for a number of times or in a predetermined time period without needing to verify user identity. For example, a token can be generated to provide authorizations for adding digital signatures to next five files received or within the next three hours, whichever condition is met first. In some embodiments, the token can be cleared and removed from the ICC when it is expired or runs out.

At 310, the token information is returned. In some embodiments, the returned token information can be viewed by a user through a computing device the ICC is inserted or integrated in, or communicably coupled to. For example, if the token is generated based on a request for performing file encryption for five times without verifying user identity, such information can be returned and viewed by the user.

After 310, the process 300 ends at 312. After a token is generated, cryptographic operations can be performed based on the user authorization indicated by the token. One such example of a process is discussed in the description of FIG. 4.

Figure 4:
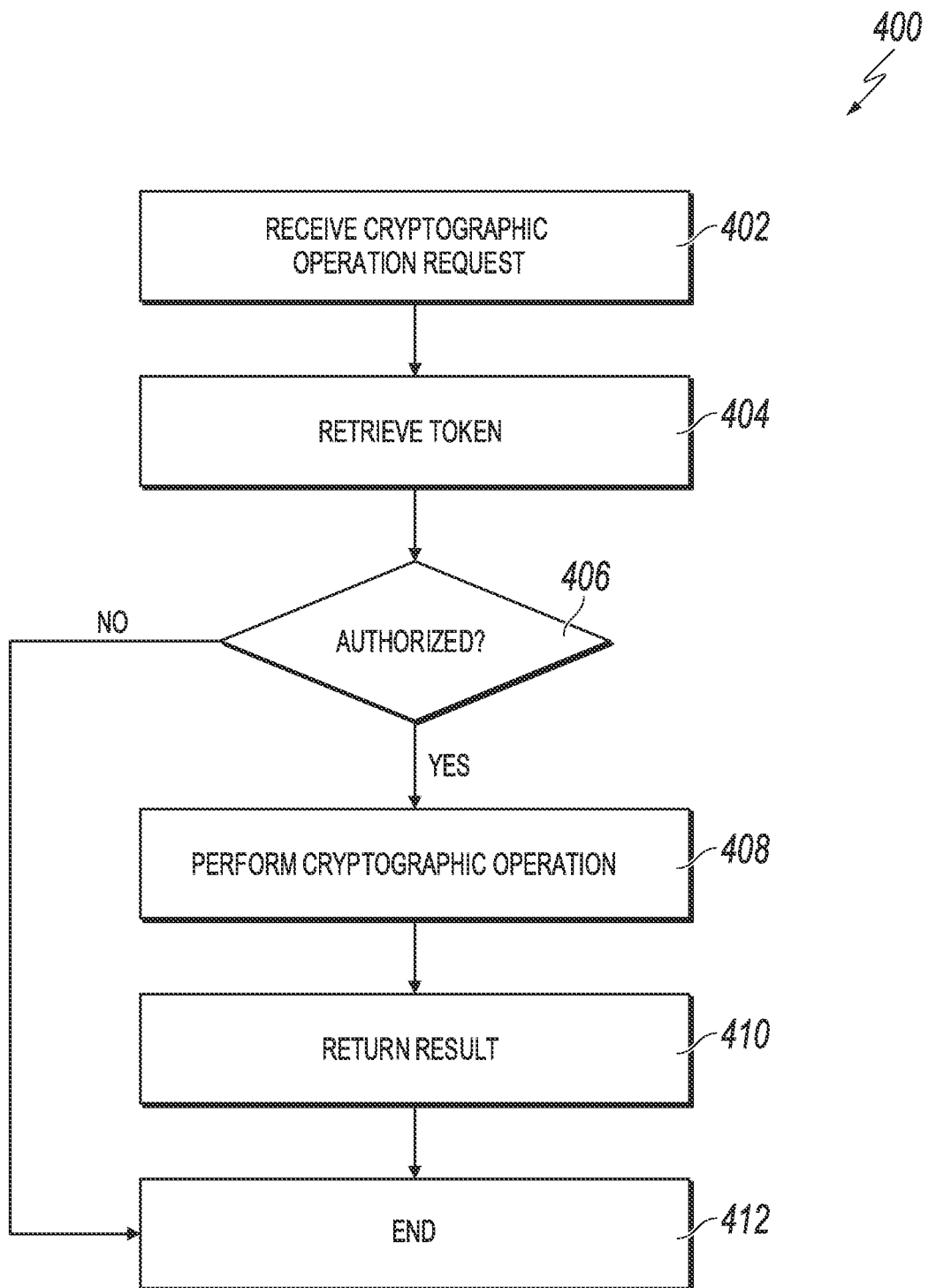
FIG. 4 is a flowchart illustrating an example of a process for performing one or more cryptographic operations using an ICC based on a token, in accordance with embodiments of this specification.

FIG. 4 is a flowchart illustrating an example of a process 400 for performing one or more cryptographic operations using an ICC based on a token in accordance with embodiments of this specification. At 402, a request for performing a cryptographic operation is received. At 404, a token temporarily stored in the ICC is retrieved. At 406, it is determined whether the requested cryptographic operation is authorized based on the token. If yes, the process 400 proceeds to 408, where the cryptographic operation is performed. The cryptographic operation results can be returned at 410 before the process 400 ends at 412. For example, if the token indicates that three encryption operations can be performed before requiring user identity verification, and the request is for performing data encryption, the data encryption operation can then be authorized and performed. The encrypted data can be returned at 410. If the token indicates that a file decryption operation can be performed within the next 30 minutes, the token will expire after 30 minutes and the subsequently received request for performing file decryption is unauthorized and will be declined. If it is determined that the requested operation is unauthorized at 406, the process 400 ends at 412. In some embodiments, instead of ending the process 400 at 412 a user can be prompted to verify its identity information again to gain authorization for performing the requested cryptographic operation.

Figure 5:
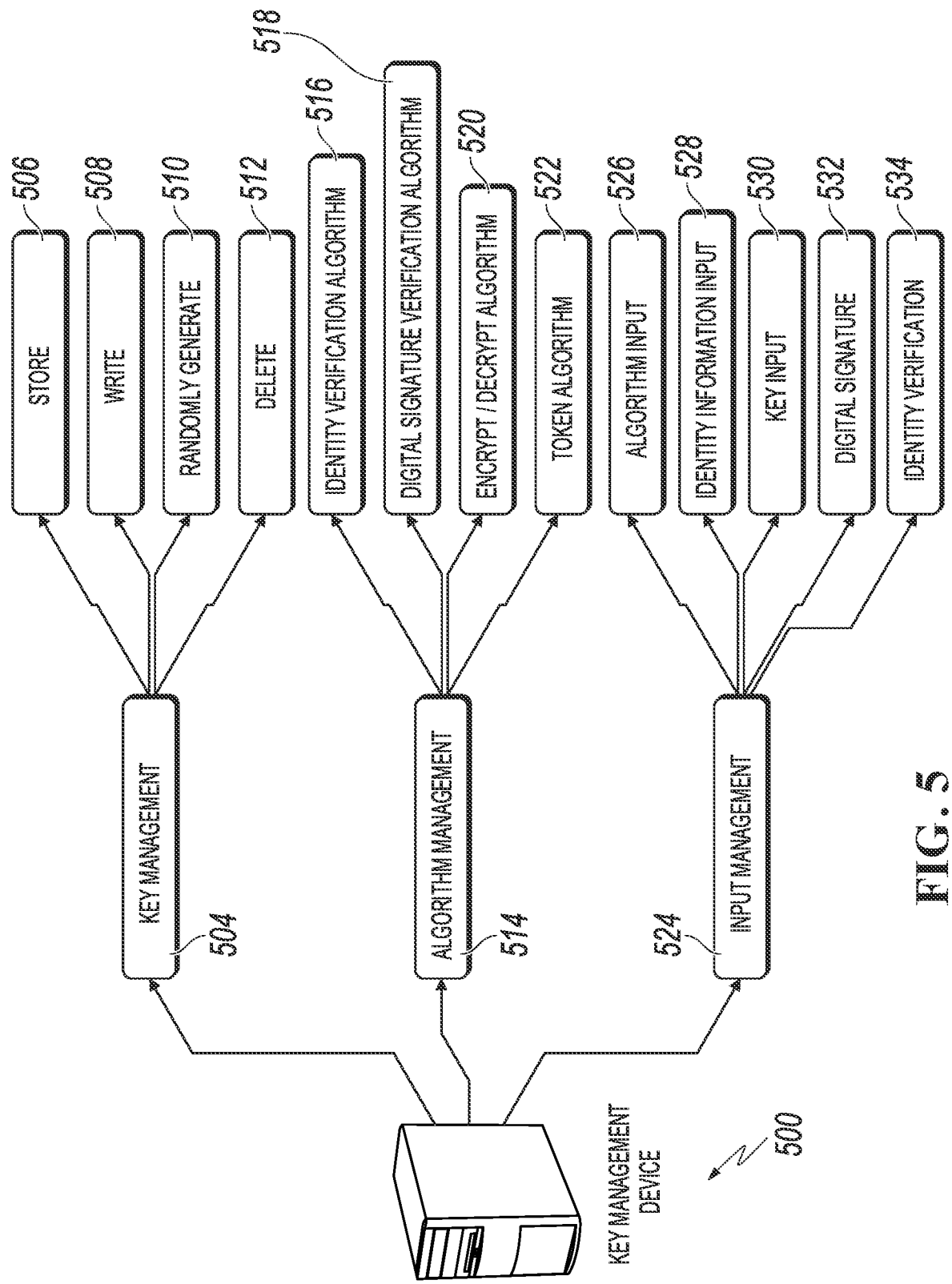
FIG. 5 is a diagram illustrating an example of a key management device, in accordance with embodiments of this specification.

FIG. 5 is a diagram illustrating an example of a key management device 500 in accordance with embodiments of this specification. In some embodiments, the cryptographic keys used by the ICC to perform cryptographic operations for the users can be managed by a key management device 500. The key management device 500 can perform key management 504 and algorithm management 514. Key management 504 can include store 506, write 508, randomly generate 510, and delete 512 cryptographic keys. The cryptographic keys are the keys associated with authorized users of an ICC to perform cryptographic operations.

The algorithms managed by the algorithm management 514 can include storing and managing identity verification algorithm 516, digital signature verification algorithm 518, encrypt and decrypt algorithm 520, and token algorithm 522. The identity verification algorithm 516 can be used to perform the identity verification as discussed in the description of step 306 of FIG. 3. The digital signature verification algorithm 518 can be used to perform digital signature verification. The encrypt and decrypt algorithm 520 can be used to perform the requested cryptographic operation as discussed in step 208 of FIG. 2 and 408 of FIG. 4. The token algorithm 522 can be used to manage a time limit or quantity limit of performing requested cryptographic operations without needing to verify user identity, as discussed in the descriptions of FIGS. 3 and 4.

In some embodiments, the key management device 500 can serve as a backup of the ICC. Even if the ICC is lost or destroyed, the cryptographic keys and algorithms for performing cryptographic operations can be retrieved from the key management device 500.

In some embodiments, the key management device 500 can also perform input management 524. The key management device 500 can be communicably coupled to the ICC to manage algorithm input 526, identity information input 528, cryptographic key input 530, digital signature generation 532, and identity verification 534.

Figure 6:
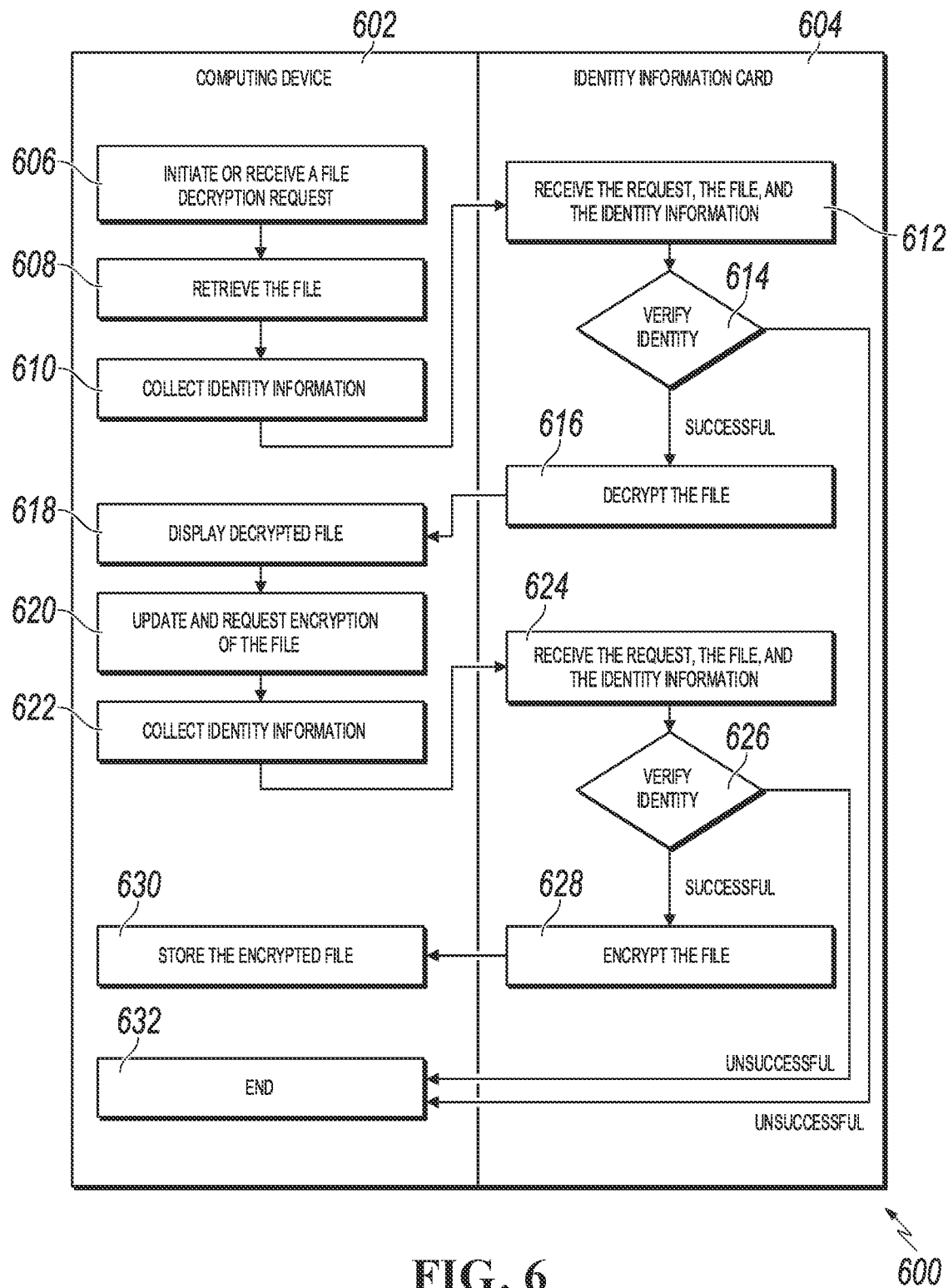
FIG. 6 is a swim-lane diagram illustrating an example of a process for performing data encryption and decryption using an identity information card (IIC), in accordance with embodiments of this specification.

FIG. 6 is a swim-lane diagram illustrating an example of a process 600 for performing data encryption and decryption using an identity information card (IIC) 604 in accordance with embodiments of this specification. At a high-level, the process 600 is performed between a computing device 602 and an IIC 604. The computing device 602 requests the IIC 604 to decrypt an encrypted file, so it can update the file. After the file is updated, the computing device 602 can request the updated file to be encrypted by the IIC 604 and store the encrypted file.

Figure 7:
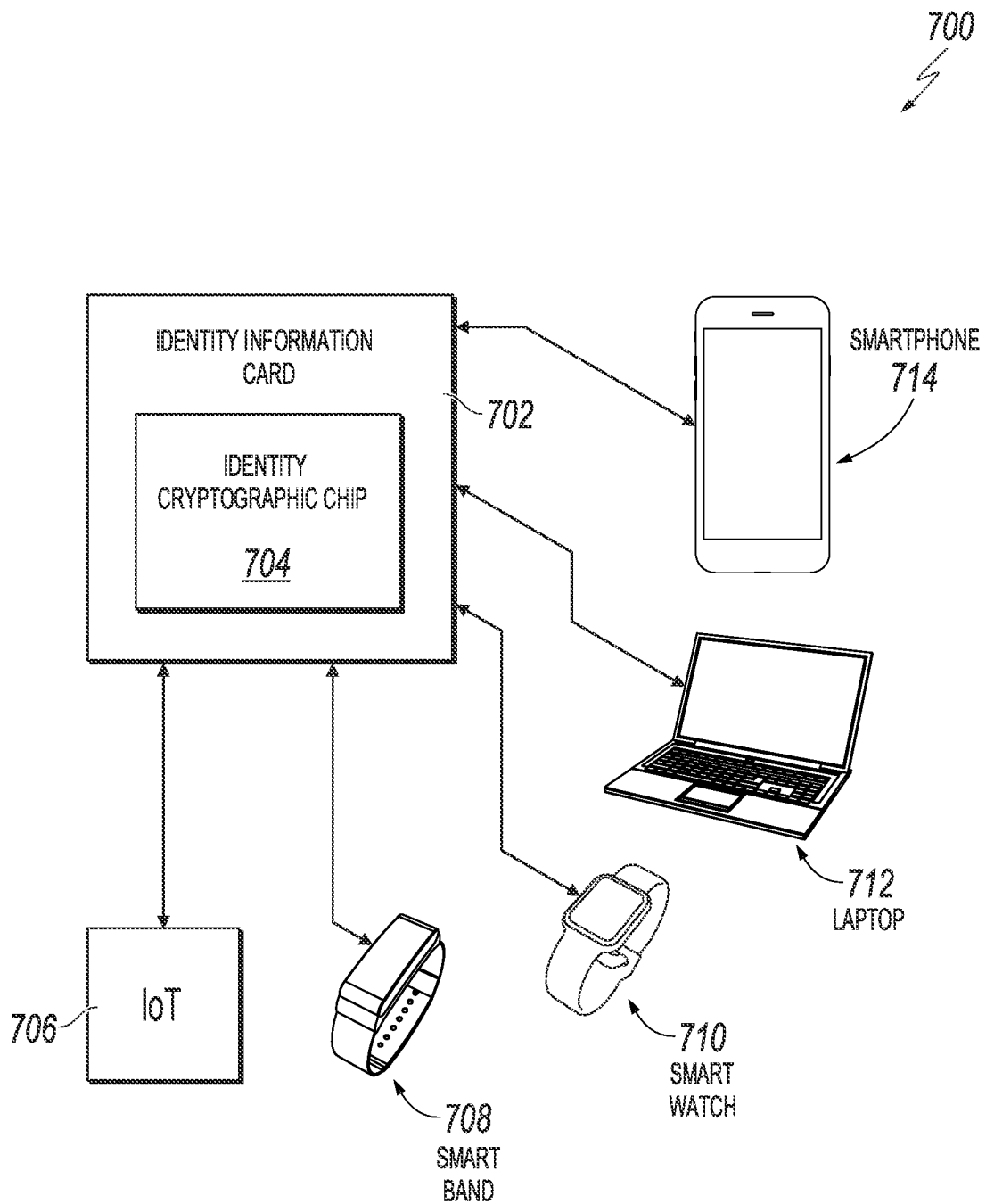
FIG. 7 depicts examples of computing devices that the IIC can be inserted, integrated, or communicably coupled to, in accordance with embodiments of this specification.

The computing device 602 can be any computing devices such as those depicted in FIG. 7. FIG. 7 depicts examples 700 of computing devices that the IIC can be inserted, integrated, or communicably coupled to in accordance with embodiments of this specification. In some embodiments, the IIC 702 can be an electronic card that can be conveniently inserted to a computing device. In some embodiments, the IIC 702 can be a shell or a hardware package that accommodates the IIC 702. In some embodiments, the ICC 704 can be integrated or embedded in the IIC 702.

Example computing devices the IIC 702 can be integrated or inserted to, or communicably coupled with can include, but are not limited to, an Internet-of-Things (IoT) device 706, a smart band 708, a smart watch 710, a laptop 712 (or a desktop computer), or a smartphone 714. The IIC 702 can communicate with the computing devices through wired or wireless connections.

Referring back to FIG. 6, at 606, the computing device 602 initiates or receives a file decryption request. In some embodiments, the computing device 602 is capable of initiating a request for file decryption. The computing device 602 can include a computer, a server, or a smartphone. In some embodiments, the computing device 602 can be a wearable device such as a smart band or a smart watch, which can receive the decryption request from another computing device that is capable of initiating the request. At 608, the computing device 602 retrieves the file to be decrypted. At 610, the computing device 602 collects identity information for identity verification using an ICC included in the IIC 604. In some embodiments, the identity information can be the user's biometric information, such as fingerprint, voiceprint, heartbeat information, and iris information. The computing device 602 can include a fingerprint sensor, microphone, heartbeat sensor, or iris scanner to collect the biometric information. The file decryption request, the file, and the collected identity information can then be sent to the IIC 604.

At 612, the IIC 604 receives the file decryption request, the file, and the identity information. At 614, the IIC 604 verifies whether the received identity information matches a pre-stored authorization identity information. Details on performing the verification are discussed in the description of FIG. 1. If the verification is successful, the file can be decrypted by an ICC included in the IIC 604 at 616. Otherwise, the process ends at 632. The decrypted file can be returned to the computing device 602. After receiving the decrypted file, the file can be displayed on the computing device 602 at 618. In some embodiments, the file can be sent to a computer or a separate display device to be displayed. At 620, the displayed file can be updated and a request can be sent back to the IIC 640 for encryption. At 622, the computing device can collect identity information of the user to be verified by the IIC for file encryption.

At 624, the IIC 604 receives the file encryption request, the updated file, and the identity information. At 626, the IIC 604 verifies whether the identity information matches the pre-stored authorization identity information. If the verification is successful, the process 600 proceeds to 628 where the IIC 604 encrypts the updated file and returns the encrypted updated file to the computing device 602. Otherwise, the process 600 ends at 632. At 630, the computing device 602 receives and stores the encrypted file. In some embodiments, the computing device 602 can forward the encrypted file to another computing device for storage.

Figure 8:
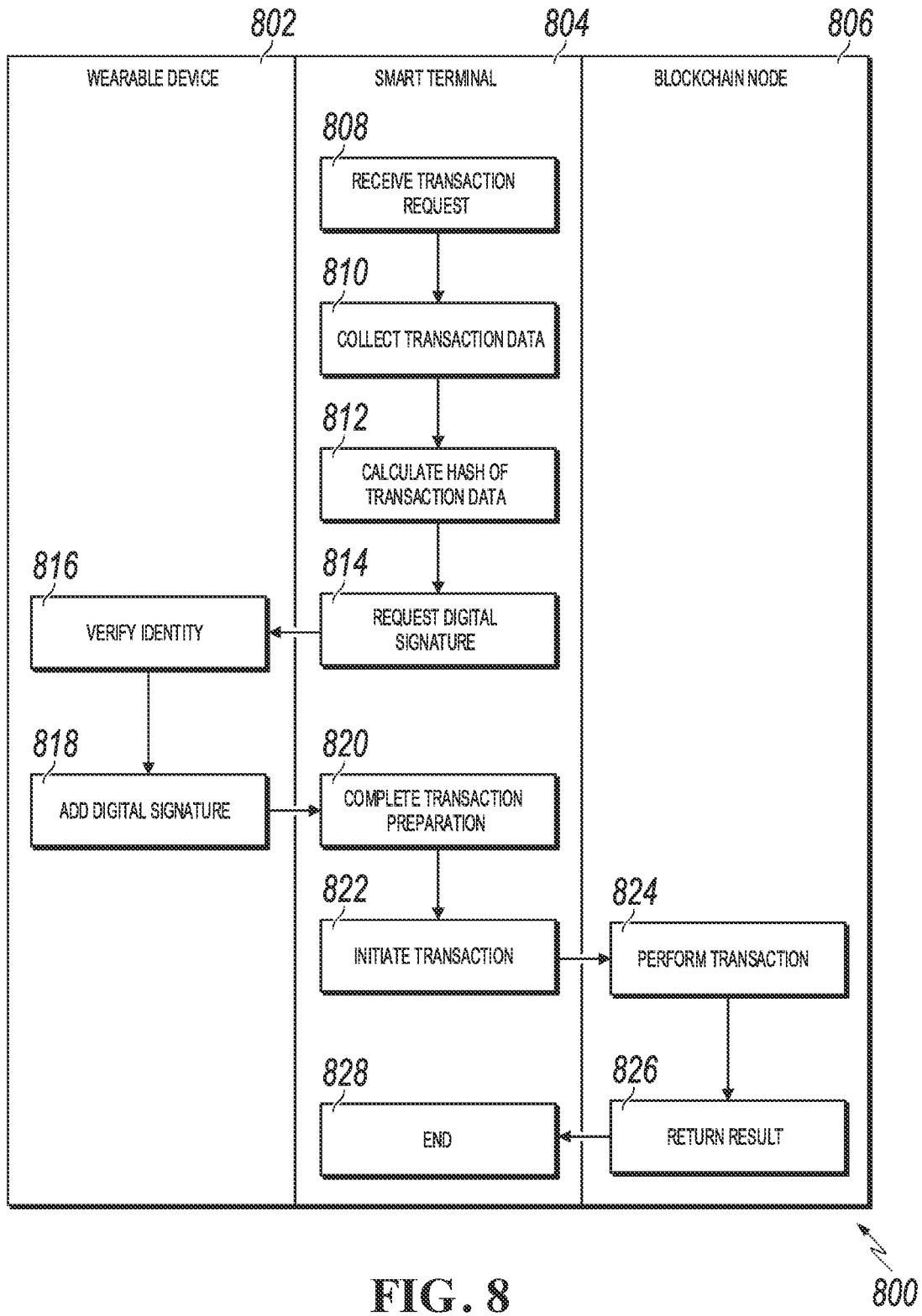
FIG. 8 is a swim-lane diagram illustrating an example of a process, in accordance with embodiments of this specification.

FIG. 8 is a swim-lane diagram illustrating an example of a process 800 in accordance with embodiments of this specification. In particular, the process 800 can be performed to securely and conveniently add a digital signature to a blockchain transaction. At a high-level, the process 800 can be performed by a wearable device 802, a smart terminal 804, and a blockchain node 806. The smart terminal 804 can be a computing device such as a computer, a smartphone, or a point-of-sale terminal. The wearable device 802 can be a wearable computing device such as a smartwatch or smart band. The wearable device 802 can include an integrated, embedded, or inserted ICC, such as the ICC discussed in the description of FIG. 1. The blockchain node 806 can be referred to as a consensus node, the consensus node can be operated by a respective entity (e.g., a blockchain user, a financial institution, insurance company). Consensus nodes in a blockchain can execute a consensus protocol to add transactions to the blockchain, and update the overall state of the blockchain network.

At 808, the smart terminal 804 receives a transaction request. At 810, the smart terminal collects transaction data to perform the transaction on a blockchain. Transaction data can be representative of a transaction between two or more participants. Examples of a transaction can include, without limitation, exchanges of something of value (e.g., assets, products, services, currency).

At 812, the smart terminal 804 calculates a hash value of the transaction data. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Furthermore, and as noted above, the hash value is of fixed length. That is, no matter the size of the transaction data, the length of the hash value is fixed. Hashing includes processing the transaction data through a hash function to generate the hash value. An example of a hash function includes, without limitation, the secure hash algorithm (SHA)-256, which outputs 256-bit hash values.

At 814, the smart terminal requests to the wearable device to add a digital signature to the hashed transaction data. The digital signature can be generated using asymmetric encryption, which enables a participant in a transaction to confirm another participant in the transaction, as well as the validity of the transaction. For example, a user of the smart terminal 804 can use a private key to digitally sign the hashed transaction data and the recipient can confirm that the hashed transaction data was sent by the user based on the digital signature. Digital signatures can also be used to ensure that messages are not tampered with in transit.

At 816, the wearable device 802 can use the embedded ICC to verify identity of the user. The identity information of the user can be collected by the smart terminal 804 or the wearable device 802. The collected identity information can be compared with the authorization identity information pre-stored on the wearable device 802. If the used identity is successfully verified, the ICC of the wearable device 802 can be used to add a digital signature to the hashed transaction data at 818 and return the digitally signed hashed transaction data to the smart terminal 804.

At 820, the smart terminal 804 completes transaction preparation. At 822, the smart terminal 804 initiates the transaction. At 824, the blockchain node performs the transaction. At 826, the blockchain node returns the transaction result to the smart terminal 804. Afterwards, the process 800 ends at 828.

Figure 9:
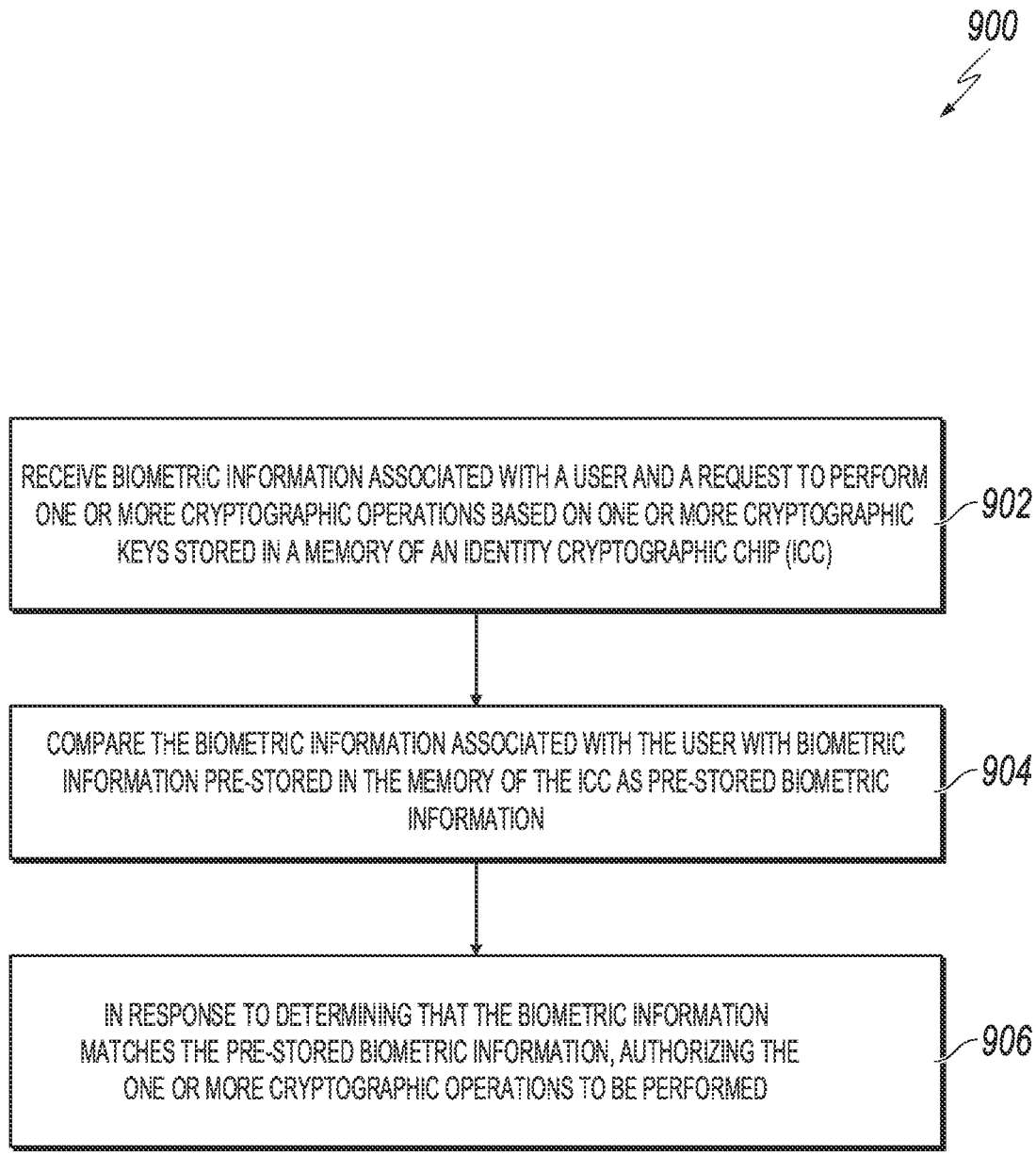
FIG. 9 depicts an example of a method that can be executed in accordance with embodiments of this specification.

FIG. 9 depicts an example of a method 900 that can be executed in accordance with embodiments of this specification. For clarity of presentation, the description that follows generally describes method 900 in the context of the other figures in this description. However, it will be understood that method 900 can be performed, for example, by any system, environment, software, and hardware, or a combination of systems, environments, software, and hardware, as appropriate. In some embodiments, various steps of method 900 can be run in parallel, in combination, in loops, or in any order. In some embodiments, the method 900 can be performed by an ICC described in accordance with embodiments of this specification.

At 902, biometric information associated with a user and a request to perform one or more cryptographic operations based on one or more cryptographic keys stored in a memory of an ICC are received. In some embodiments, the one or more cryptographic operations are performed based on an asymmetric key pair associated with the user, and the cryptographic operations include one or more of an encryption operation, a decryption operation, or a digital signature generation operation. In some embodiments, the memory is a programmable read-only memory (PROM), an electrically-erasable PROM (EEPROM) or a flash memory, and wherein the biometric information and the asymmetric key pair are stored in separate storage units of the memory.

At 904, the biometric information associated with the user is compared with biometric information pre-stored in a memory of the ICC as pre-stored biometric information.

At 906, in response to determining that the biometric information matches the pre-stored biometric information, authorizing the one or more cryptographic operations to be performed. In some embodiments, the one or more cryptographic operations are performed to produce an operational result. The operational result is sent to a computing device communicably coupled to the ICC to be presented to the user.

In some embodiments, the request is for performing the one or more cryptographic operations for at least one of a predetermined number of times or in a predetermined time period, the one or more cryptographic operations are authorized to be performed for the at least one of the predetermined number of times or in the predetermined time period, and the computer-implemented method 900 further comprises: generating a token that records the at least one of the predetermined number of times or the predetermined time period; temporarily storing the token until the token expires, wherein the token expires in response to performance of the one or more cryptographic operations for the predetermined number of times or a lapse of the predetermined time period; and sending the token to the computing device.

In some embodiments, the request is a first request, the operational result is a first operational result, and the method 900 further comprises: receiving a second request for performing a cryptographic operation; determining that the token is unexpired; and performing the cryptographic operation to produce a second operational result. In some embodiments, the first request is for decrypting a first data, the second operational result is plaintext of the first data, the biometric information is first biometric information, and the computer-implemented method further comprises: receiving second biometric information and a third request for encrypting a second data associated with the plaintext of the first data; in response to determining that the second biometric information matches the pre-stored biometric information, encrypting the second data to provide an encrypted second data; and sending the encrypted second data to the computing device.

In some embodiments, comparing the biometric information with the pre-stored biometric information is performed based on biometric recognition; and the biometric recognition includes one or more of fingerprint recognition, voiceprint recognition, iris-scanning, facial recognition, and heartbeat recognition.

Figure 10:
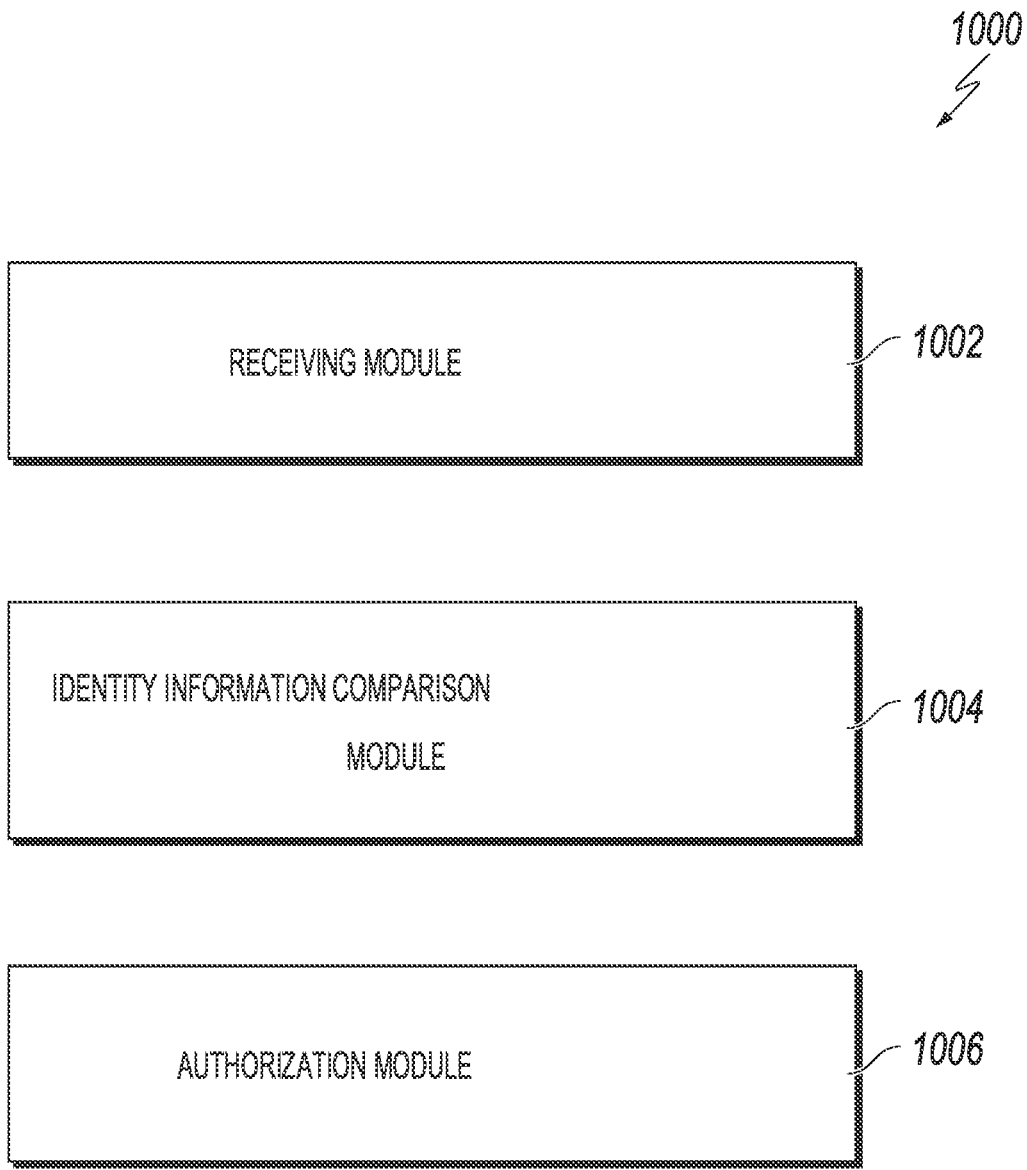
FIG. 10 depicts examples of modules of an apparatus, in accordance with embodiments of this specification.

FIG. 10 depicts examples of modules of an apparatus in accordance with embodiments of this specification. The apparatus 1000 can be an example of an embodiment of an ICC. The apparatus 1000 can correspond to the embodiments described above, and the apparatus 1000 includes the following:

A receiving module 1002 to receive biometric information associated with a user and a request to perform one or more cryptographic operations based on one or more cryptographic keys stored in a memory of an ICC.

An identity information comparison module 1004 to compare the biometric information associated with the user with biometric information pre-stored in the memory of the ICC as pre-stored biometric information.

An authorization module 1006 to authorize the one or more cryptographic operations to be performed, in response to determining that the biometric information matches the pre-stored biometric information.

In an optional embodiment, comparing the biometric information with the pre-stored biometric information is performed based on biometric recognition; and the biometric recognition includes one or more of fingerprint recognition, voiceprint recognition, iris-scanning, facial recognition, and heartbeat recognition.

In an optional embodiment, the one or more cryptographic operations are performed based on an asymmetric key pair associated with the user, and the cryptographic operations include one or more of an encryption operation, a decryption operation, or a digital signature generation operation.

In an optional embodiment, the memory is a programmable read-only memory (PROM), an electrically-erasable PROM (EEPROM) or a flash memory, and wherein the biometric information and the asymmetric key pair are stored in separate storage units of the memory.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

The techniques described in this specification produce several technical effects. For example, embodiments of the subject matter permit a user of an ICC to store multiple cryptographic keys for securely perform cryptographic operations. The cryptographic keys can be stored to the ICC based on verifying the user's identity information. The ICC will reject cryptographic key information input if the identity information verification fails.

To request the ICC for performing cryptographic operations, a user's identity information needs to be collected and verified against the identity information previously authenticated and stored in the ICC. As such, it can be ensured that the user who requested the cryptographic operation is the owner of the cryptographic keys.

Moreover, the identity information and cryptographic keys can be encrypted before storing to the memory of the ICC. The information is only decrypted in the ICC to perform corresponding identity verification and cryptographic operations. The cryptographic operations are performed inside of the ICC and only the operational result is output from the ICC. Therefore, the ICC users' identity information and cryptographic keys are secure and cannot be revealed even if the ICC is hacked or reverse engineered. In some embodiments, a key management device can be used to store the identity information and cryptographic keys in ciphertext to provide backup to the ICC and further enhance data security.

A computing device can be used to collect user identity information and initiate a request for cryptographic operations. The ICC can communicate with the computing device wirelessly, through various communications protocols, or it can be integrated or inserted into the computing device to be easily used for secured cryptographic operations.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for securely performing cryptographic operations, the method comprising:
    receiving biometric information associated with a first user and a request to perform one or more cryptographic operations using one or more cryptographic keys stored in a memory of an identity cryptographic chip (ICC), the one or more cryptographic keys being associated with the first user;
    comparing the biometric information associated with the first user with biometric information pre-stored in the memory of the ICC as pre-stored biometric information, wherein the pre-stored biometric information comprises fingerprint information, voice information, heartbeat information, iris information, or a combination thereof;
    determining that the biometric information associated with the first user matches the pre-stored biometric information;
    in response to determining that the biometric information associated with the first user matches the pre-stored biometric information, authorizing the one or more cryptographic operations to be performed using the one or more cryptographic keys associated with the first user;
    generating a token that records at least one of a predetermined number of times that the one or more cryptographic operations are authorized to be performed and a predetermined time period during which the one or more cryptographic operations are authorized to be performed;
    temporarily storing the token until the token expires, wherein the token expires in response to performance of the one or more cryptographic operations for the predetermined number of times or a lapse of the predetermined time period;
    sending the token to a computing device communicably coupled to the ICC;
    receiving new biometric information associated with a second user;
    clearing the memory of the ICC, including the one or more cryptographic keys associated with the first user; and
    subsequent to clearing the memory of the ICC,
        writing the new biometric information to the memory, wherein the new biometric information cannot be written to the memory before the memory, including the one or more cryptographic keys associated with the first user, is cleared, and
        writing, to the memory, one or more new cryptographic keys associated with the second user.

2. The computer-implemented method of claim 1, further comprising:
    performing the one or more cryptographic operations to produce an operational result; and
    sending the operational result to the computing device communicably coupled to the ICC to be presented to the first user.

3. The computer-implemented method of claim 2, wherein the request is for performing the one or more cryptographic operations for at least one of the predetermined number of times or in the predetermined time period.

4. The computer-implemented method of claim 2, wherein the request is a first request, the operational result is a first operational result, and the method further comprises:
    receiving a second request for performing a cryptographic operation;
    determining that the token is unexpired; and
    performing the cryptographic operation to produce a second operational result.

5. The computer-implemented method of claim 4, wherein the first request is for decrypting a first data, the second operational result is plaintext of the first data, the biometric information associated with the first user is first biometric information, and the computer-implemented method further comprises:
    receiving second biometric information and a third request for encrypting a second data associated with the plaintext of the first data;
    in response to determining that the second biometric information matches the pre-stored biometric information, encrypting the second data to provide an encrypted second data; and
    sending the encrypted second data to the computing device.

6. The computer-implemented method of claim 1, wherein:
    comparing the biometric information with the pre-stored biometric information is performed based on biometric recognition; and
    the biometric recognition includes one or more of fingerprint recognition, voiceprint recognition, iris-scanning, facial recognition, and heartbeat recognition.

7. The computer-implemented method of claim 1, wherein the one or more cryptographic operations are performed based on an asymmetric key pair associated with the first user, and the cryptographic operations include one or more of an encryption operation, a decryption operation, or a digital signature generation operation.

8. The computer-implemented method of claim 7, wherein the memory is a programmable read-only memory (PROM), an electrically-erasable PROM (EEPROM) or a flash memory, and wherein the biometric information and the asymmetric key pair are stored in separate storage units of the memory.

9. A non-transitory, computer-readable storage medium storing one or more instructions executable by a computer system to perform operations comprising:

receiving biometric information associated with a first user and a request to perform one or more cryptographic operations using one or more cryptographic keys stored in a memory of an identity cryptographic chip (ICC), the one or more cryptographic keys being associated with the first user;

comparing the biometric information associated with the first user with biometric information pre-stored in the memory of the ICC as pre-stored biometric information, wherein the pre-stored biometric information comprises fingerprint information, voice information, heartbeat information, iris information, or a combination thereof;

determining that the biometric information associated with the first user matches the pre-stored biometric information;

in response to determining that the biometric information associated with the first user matches the pre-stored biometric information, authorizing the one or more cryptographic operations to be performed using the one or more cryptographic keys associated with the first user;

generating a token that records at least one of a predetermined number of times that the one or more cryptographic operations are authorized to be performed and a predetermined time period during which the one or more cryptographic operations are authorized to be performed;

temporarily storing the token until the token expires, wherein the token expires in response to performance of the one or more cryptographic operations for the predetermined number of times or a lapse of the predetermined time period;

sending the token to a computing device communicably coupled to the ICC;

receiving new biometric information associated with a second user;

clearing the memory of the ICC, including the one or more cryptographic keys associated with the first user; and subsequent to clearing the memory of the ICC,
writing the new biometric information to the memory, wherein the new biometric information cannot be written to the memory before the memory, including the one or more cryptographic keys associated with the first user, is cleared, and
writing, to the memory, one or more new cryptographic keys associated with the second user.

10. The non-transitory, computer-readable storage medium of claim 9, wherein the operations further comprise:
performing the one or more cryptographic operations to produce an operational result; and
sending the operational result to the computing device communicably coupled to the ICC to be presented to the first user.

11. The non-transitory, computer-readable storage medium of claim 10, wherein the request is for performing the one or more cryptographic operations for at least one of the predetermined number of times or in the predetermined time period.

12. The non-transitory, computer-readable storage medium of claim 10, wherein the request is a first request, the operational result is a first operational result, and the operations further comprise:
receiving a second request for performing a cryptographic operation;
determining that the token is unexpired; and
performing the cryptographic operation to produce a second operational result.

13. The non-transitory, computer-readable storage medium of claim 12, wherein the first request is for decrypting a first data, the second operational result is plaintext of the first data, the biometric information associated with the first user is first biometric information, and the operations further comprise:
receiving second biometric information and a third request for encrypting a second data associated with the plaintext of the first data;
in response to determining that the second biometric information matches the pre-stored biometric information, encrypting the second data to provide an encrypted second data; and
sending the encrypted second data to the computing device.

14. The non-transitory, computer-readable storage medium of claim 9, wherein:
comparing the biometric information with the pre-stored biometric information is performed based on biometric recognition; and
the biometric recognition includes one or more of fingerprint recognition, voiceprint recognition, iris-scanning, facial recognition, and heartbeat recognition.

15. The non-transitory, computer-readable storage medium of claim 9, wherein the one or more cryptographic operations are performed based on an asymmetric key pair associated with the first user, and the one or more cryptographic operations include one or more of an encryption operation, a decryption operation, or a digital signature generation operation.

16. The non-transitory, computer-readable storage medium of claim 15, wherein the memory is a programmable read-only memory (PROM), an electrically-erasable PROM (EEPROM) or a flash memory, and wherein the biometric information and the asymmetric key pair are stored in separate storage units of the memory.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving biometric information associated with a first user and a request to perform one or more cryptographic operations using one or more cryptographic keys stored in a memory of an identity cryptographic chip (ICC), the one or more cryptographic keys being associated with the first user;
comparing the biometric information associated with the first user with biometric information pre-stored in the memory of the ICC as pre-stored biometric information, wherein the pre-stored biometric information comprises fingerprint information, voice information, heartbeat information, iris information, or a combination thereof;

determining that the biometric information associated with the first user matches the pre-stored biometric information;

in response to determining that the biometric information associated with the first user matches the pre-stored biometric information, authorizing the one or more cryptographic operations to be performed using the one or more cryptographic keys associated with the first user;

generating a token that records at least one of a predetermined number of times that the one or more cryptographic operations are authorized to be performed and a predetermined time period during which the one or more cryptographic operations are authorized to be performed;

temporarily storing the token until the token expires, wherein the token expires in response to performance of the one or more cryptographic operations for the predetermined number of times or a lapse of the predetermined time period;

sending the token to a computing device communicably coupled to the ICC;

receiving new biometric information associated with a second user;

clearing the memory of the ICC, including the one or more cryptographic keys associated with the first user; and subsequent to clearing the memory of the ICC,
writing the new biometric information to the memory, wherein the new biometric information cannot be written to the memory before the memory, including the one or more cryptographic keys associated with the first user, is cleared, and
writing, to the memory, one or more new cryptographic keys associated with the second user.

18. The computer-implemented system of claim 17, wherein the operations further comprise:
performing the one or more cryptographic operations to produce an operational result; and
sending the operational result to the computing device communicably coupled to the ICC to be presented to the first user.

19. The computer-implemented system of claim 18, wherein the request is for performing the one or more cryptographic operations for at least one of the predetermined number of times or in the predetermined time period.

20. The computer-implemented system of claim 18, wherein the request is a first request, the operational result is a first operational result, and the operations further comprise:
receiving a second request for performing a cryptographic operation;
determining that the token is unexpired; and
performing the cryptographic operation to produce a second operational result.

21. The computer-implemented system of claim 20, wherein the first request is for decrypting a first data, the second operational result is plaintext of the first data, the biometric information associated with the first user is first biometric information, and the operations further comprise:
receiving second biometric information and a third request for encrypting a second data associated with the plaintext of the first data;
in response to determining that the second biometric information matches the pre-stored biometric information, encrypting the second data to provide an encrypted second data; and
sending the encrypted second data to the computing device.

22. The computer-implemented system of claim 17, wherein:
comparing the biometric information with the pre-stored biometric information is performed based on biometric recognition; and
the biometric recognition includes one or more of fingerprint recognition, voiceprint recognition, iris-scanning, facial recognition, and heartbeat recognition.

23. The computer-implemented system of claim 17, wherein the one or more cryptographic operations are performed based on an asymmetric key pair associated with the first user, and the one or more cryptographic operations include one or more of an encryption operation, a decryption operation, or a digital signature generation operation.

24. The computer-implemented system of claim 23, wherein the memory is a programmable read-only memory (PROM), an electrically-erasable PROM (EEPROM) or a flash memory, and wherein the biometric information and the asymmetric key pair are stored in separate storage units of the memory.

25. The computer-implemented method of claim 1, wherein the biometric information associated with the first user is compared with the biometric information pre-stored in the memory of the ICC using an identity verification algorithm stored in the memory of the ICC, and further comprising:
performing the one or more cryptographic operations using a cryptographic operation algorithm stored in the memory of the ICC,
wherein the identity verification algorithm and the cryptographic operation algorithm are stored in encrypted form.

26. The non-transitory, computer-readable storage medium of claim 9, wherein the biometric information associated with the first user is compared with the biometric information pre-stored in the memory of the ICC using an identity verification algorithm stored in the memory of the ICC, and wherein the operations further comprise:
performing the one or more cryptographic operations using a cryptographic operation algorithm stored in the memory of the ICC,
wherein the identity verification algorithm and the cryptographic operation algorithm are stored in encrypted form.

27. The computer-implemented system of claim 17, wherein the biometric information associated with the first user is compared with the biometric information pre-stored in the memory of the ICC using an identity verification algorithm stored in the memory of the ICC, and wherein the operations further comprise:
performing the one or more cryptographic operations using a cryptographic operation algorithm stored in the memory of the ICC, wherein the identity verification algorithm and the cryptographic operation algorithm are stored in encrypted form.

* * * * *